May 7, 1968 H. W. PLOCH ETAL 3,381,554
BUSHINGS FOR LOCATING TWO ADJACENT PARTS
Original Filed Oct. 30, 1964
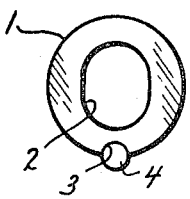
FIG. 1.
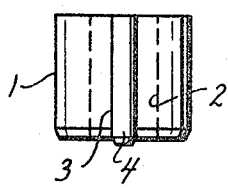
FIG. 2.
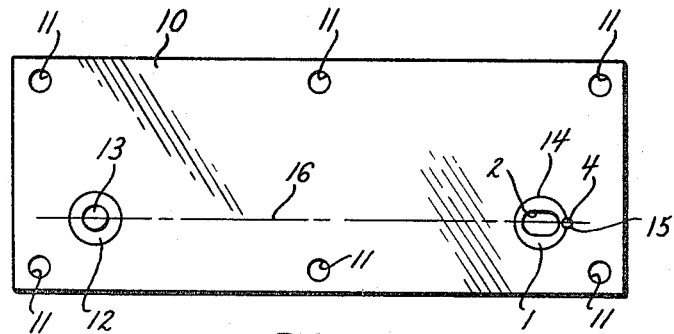
FIG. 3.
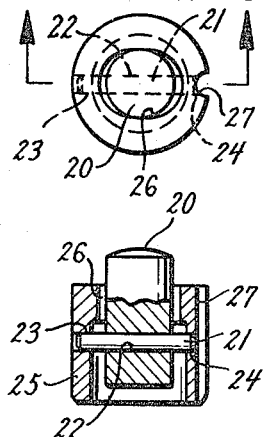
FIG. 4.
FIG. 5.
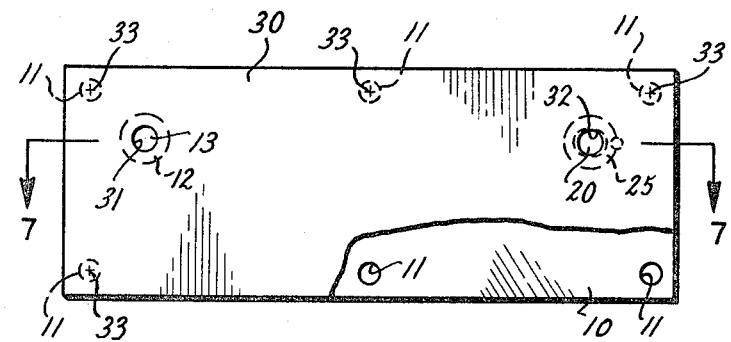
FIG. 6.
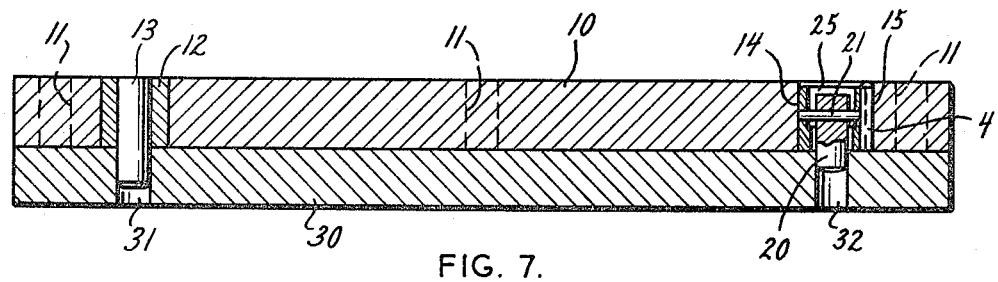
FIG. 7.
INVENTORS
HENRY W. PLOCH
ROBERT T. GRAVLIN
BYRON W. PEASE
BY Gravely, Lieder + Woodruff
ATTORNEYS United States Patent Office 3,381,554
Patented May 7, 1968

3,381,554
BUSHINGS FOR LOCATING TWO
ADJACENT PARTS
Henry W. Ploch, Robert T. Gravlin, and Byron W. Pease, St. Louis, Mo., assignors to McDonnell Aircraft Corporation, St. Louis, Mo., a corporation of Maryland
Continuation of application Ser. No. 407,790, Oct. 30, 1964. This application June 30, 1967, Ser. No. 655,262
2 Claims. (Cl. 77—62)

ABSTRACT OF THE DISCLOSURE

Bushings for locating two adjacent parts in a predetermined registered relation to each other where one of the parts is a jig or fixture and the other part is the stock that is to be machined or otherwise formed into a production part.

---

This application is a continuation of our prior application, Ser. No. 407,790, filed Oct. 30, 1964, now abandoned.

The present invention relates to locating type bushings, and more particularly to a bushing adapted to afford angular reference from a fixed point on manufacturing jigs or fixtures that comprise production tools generally. More specifically, the invention relates to bushings to provide angular location from a fixed point with a relatively wide tolerance of the radial distance therefrom.

Various jig fixtures and similar tools have been previously designed with locating holes which are used for locating stock material that will become production parts and in which a pair of fixed reference holes or points are provided. Heretofore such jigs or fixtures or tools require reference holes and bushings therefor at extremely close tolerance to maintain appropriate tolerance on production parts. Thus, in the past when one of the holes on a production part is out of tolerance with the tool, it will not readily fit over the usual mounting pins inserted in the reference or locator holes in the tool, hence the tool has to be redrilled. Likewise, it is essential that the part locator holes be drilled with close tolerances to permit the template to fit the locator hole. Thus, all previous parts or members, whether guide templates, fixture tool or not, for fixing the position of production parts have either prevented close tolerances in locating such holes or required excessive cost to achieve that end.

The present invention avoids the tolerance difficulty of prior art techniques by providing a first part having a first bushing with a circular hole, or just a plain hole and a second or locator bushing at a spaced position relative to the first bushing or hole, but with a relatively wide tolerance in direction of movement toward or therefrom for aligning locator points by which the production part is mounted on the first part. This is achieved by the bushing having an elongated or oval bore rather than a circular bore as in the first bushing or hole. The tolerance along the line of tolerance is held by providing a key pin for the bushing which holds the bushing aligned along the long diameter or major axis of the oval bore. The key pin is seated in the external surface of the bushing. The oval bushing and key pin, if desired, may be fusion welded to one another. The first part is drilled with a key pin hole and a bushing hole in the same machine that drills the round hole for a fixed key pin. If the locator holes in the production part for accommodating the mounting pins for the first part are at the proper tolerance then the elongated bushing is unnecessary. However, where the locator holes for the mounting pins in the production part are not within the tolerance of the holes in the first part, the elongated bushing is used.

The elongated bushing may be provided with a diametrical keyway or slot for a key pin slidably mounted thereon. The diametrical keyway is located on the axis of the long diameter of the bushing, thus providing movement in a radial direction with respect to the position of the circular bushing.

It is therefore an object of the invention to provide a first part with an improved arrangement of holes and bushing for association with production parts that have pre-formed mounting holes therein, and to utilize the improved bushing to take care of alignment between the first part and the production part upon the insertion of mounting pins in the holes and the bushing.

It is another object of the invention to provide an improved bushing which fixes a predetermined angular location for a production part from a fixed point bushing, yet accommodates radial displacement or misalignment of locating holes in a production part throughout a relatively wide tolerance.

It is another object of the invention to provide a floating locator pin bushing for maintaining a fixed angular displacement about a fixed point, but which permits radial displacement between the locator pin and the fixed point.

Another object of the invention is to provide a bushing for use in a member for production parts, which member has an oval bore therein and supports a locator pin free to slide on a diametrical dowel key along the long or major diameter of said oval bore, and includes a dowel pin to fix the bushing with the long diameter of the bore on a radial line with a fixed point bushing.

These and other objects and advantages of the invention will become more apparent from the ensuing description along with the appended claims in conjunction with the drawings wherein:

FIG. 1 is a top view of one of the bushings appertaining to the invention;

FIG. 2 is a side view of the bushing in FIG. 1;

FIG. 3 depicts a fixture base or member employing the bushing of FIG. 1 appertaining to the invention;

FIG. 4 is a top view of another bushing modified to include a floating locator pin;

FIG. 5 is a cross sectional view of FIG. 4 taken along line 5—5;

FIG. 6 is a view illustrating a fixture base or member for a production part fitted with the bushing of FIG. 4 appertaining to the invention; and FIG. 7 is a cross sectional view of FIG. 6 taken along line 7—7 thereof.

Before proceeding with a description of the drawings it should be noted that the present improvement is applicable to fixtures that are used in conjunction with materials to be worked upon by tools for converting the materials into production parts. It is known in this art to have a jig or sub-base form provided with a surface on which a production part can be mounted. The sub-base usually has many holes in patterns that can be variously selected to locate a production part on the fixture base in a predetermined desired position. Pins are used to secure the part to the fixture base, and the troubles heretofore have been that unless extreme accuracy is achieved, one of the pins may not "fit" because overlying holes in both the sub-base and the fixture base are not sufficiently closely aligned. The present locator bushing solved this problem by having a slot instead of a hole, with the slot aligned with its major diameter on a line through the center of one of the sub-base holes that is to be engaged by a pin. Thus the pin for the slotted locator bushing can easily be located within the limits of the major diameter, to fit the sub-base hole without allowing deviations of an angular character and can still fit in the sub-base hole. This concept is depicted in FIG. 3.

When a piece of material to be converted to a production part is mounted on the fixture base, the fixture base is provided with a fixed pin and with a floating pin carried in a locator bushing. The material is provided with spaced plain holes at about the spacing of the fixed and floating pins, whereby the spacing of the plain holes will quickly be matched by the fixed and floating pins. Since the fixed and floating pins have a preselected relation to rectangular coordinates, the production part will be located in a desired position.

Referring now to FIGS. 1 and 2 the bushing 1 appertaining to the invention has a circular outer diameter and an oval inner bore 2. Along the long axis of bore 2 at the outer surface of bushing 1 is an arcuate keyway 3 which has a key pin 4 fixed thereto. Alternatively, bushing 1 and key pin 4 may be separately applied in which case the key pin is held in arcuate key way 3 by the body of the surrounding material.

Referring to FIG. 3, a typical production member or fixture 10 is depicted with a series of screw mounting holes 11 which are to be drilled in all production plates with a specific close tolerance relationship therebetween. Member 10 has a fixed point bushing 12 of suitable hardenable material with an opening to receive mounting pin 13 providing a fixed point by which the two parts are initially joined. The bushing 12 has a plain round hole therein which can also be representative of a plain hole directly in the part 10 without a separate bushing. A second bushing at a fixed angular position from bushing 12 is seated in a suitable bore 14 with key pin 4 seated partly in arcuate keyway 3 and partly in the pin bore 15 of the member 10. In this manner, the long diameter or major axis of bore 2 in bushing 1 is radially aligned at the fixed angular displacement from the center of the hole for pin 13 as represented by radial line 16. Since the pin 13 in bushing 12 fixes one end of the member 10 it is only necessary to insert another pin or dowel in the elongated bore 2 of bushing 1 to positively fix the position of the whole member 10.

Referring now to FIGS. 4 and 5, the floating mounting locator pin 20 is fixed by retainer pin 21 in a cross bore 22 of locator pin 20 and seats in apertures 23 and 24 of bushing 25. Apertures 23 and 24 support retainer pin 21 aligned with the major diameter of bore 26 in bushing 25. Arcuate keyway 27 is provided in the outer surface of bushing 25 aligned with the major diameter of bore 26 so that a dowel pin 4' (FIG. 6) can be used to orient the bushing. The pin 20 may have some tolerance variations with its supporting cross pin 21, but this is not detrimental as this type of tolerance will allow the outer end of the pin 20 some degree of tilt for easy insertion into a production part as will be described.

Referring now to FIGS. 6 and 7 there is illustrated a production part 30 mounted on a member 10 by pin reception holes 31 and 32 therein. Fixed point locator pin 13 seated in bushing 12 fixed in the member 10 projects into locating hole 31 in part 30. Locating member hole 32 in the part is to determine the angular position on the member 10 and this is done with pin 20 of bushing 25 seated therein. Pin 20 is held by retainer pin 21 and is depicted at the average radial displacement from fixed point 13 to be received in hole 32. From the foregoing, it will be appreciated that the distance between pins 31 and 32 need not be figured to a close tolerance as locator pin 20 in bushing 25 may adjust radially to engage locating hole 32 so long as holes 31 and 32 are properly drilled in the production part.

From the foregoing it will be appreciated that the invention provides a first member or part with a fixed point bushing and a variable point bushing at a fixed angular displacement from the fixed point bushing and the variable point bushing. Hence, the member or part appertaining to the invention may be utilized to provide the appropriate relationship for production operations, with respect to locating holes in the production part.

While the member 10 in FIG. 3 is shown separately from the member 30 in FIG. 6, it is understood by those skilled in this art that the members 10 and 30 may be the same. In this event, the bushings 12 and 1 are utilized to accurately position the member 10 or 30 on a sub-base or other larger part (not shown). The pin to be inserted in bushing 12 will fix the position of the member except for angular location, and the pin to be inserted in bushing 1 will fix the angular location. The elongated bore 2 avoids having to go to the expense of accurate drilling two holes when accurate location of one hole and the use of locator bushing 1 will suffice.

The member 10 or 30 is mounted on its sub-base (not shown) as above described, and before so mounting it is provided with a fixed pin 13 and with a bushing of the type shown in FIGS. 4 and 5. The pin 13 and the bushing pin 20 project to the same side to be in position for quickly receiving a workpiece or production part 30. The part 30, and all similar parts, needs to have two holes provided therein which are spaced to roughly match the spacing of pins 13 and 20. Since pin 20 has radial movement relative to pin 13 it can easily adjust to fit the tolerance variations in the holes 31 and 32. The work performed on parts 30 will in no way be affected by the pins 13 and 20.

Therefore, it will be understood and appreciated that various modifications and changes to the invention are apparent and such changes and modifications are deemed to be within the scope and spirit of the invention which is limited only as necessitated by the scope of the appended claims.

What is claimed is:

1. The improvement in means for locating two parts to be connected together in a predetermined position said improvement including one part having a pair of round holes spaced apart, a bushing inserted in one of said holes and having an elongated opening therein with major and minor axes, a key element engaged in said one part and holding said bushing in predetermined angular position with said major axis aligned with the center of the other of said holes, said major axis being located to coincide with the desired angular position, a first pin carried in one of said holes, a second pin floatingly mounted in said bushing to have limited movement in a direction toward and away from said first pin, and the other part having pin receiving openings therein spaced apart to substantially match the spacing between said hole and said bushing in said one part, said elongated opening in said bushing providing for tolerance variations in the spacing of said openings in said other part.

2. The improvement in means for locating two parts to be connected together in predetermined registration: said improvement including one part having a pair of spaced apertures therein, a bushing mounted in one of said apertures, the other of said apertures having a plain round opening therethrough and said bushing having an elongated opening therethrough defined by major and minor diameters in which the major diameter is directed so as to be in alignment with substantially the center of the plain hole in said one aperture; a key element engaged in said one part and a margin of bushing for holding the latter bushing against angular movement and with its major diameter in said alignment; the other part having openings therein spaced apart to substantially match the spacing between the openings in said aperture and bushing in said one part; and pins inserted in said bushing and openings in said two parts, said pin mounted in said elongated opening of said bushing being relatively free to move only in the direction of said major diameter whereby said parts are brought into predetermined overlying registration.

References Cited

UNITED STATES PATENTS 2,492,528  12/1949  Huebner _____ 33—184.5

FRANCIS S. HUSAR, *Primary Examiner.*